US012339671B2

(12) United States Patent
Jeong (10) Patent No.: US 12,339,671 B2
(45) Date of Patent: Jun. 24, 2025

(54) METHOD AND APPARATUS FOR CONTROLLING LOGISTICS ROBOT

(71) Applicant: HYUNDAI MOBIS CO., LTD., Seoul (KR)

(72) Inventor: Min Cheol Jeong, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 196 days.

(21) Appl. No.: 18/366,147

(22) Filed: Aug. 7, 2023

(65) Prior Publication Data

US 2024/0094742 A1 Mar. 21, 2024

(30) Foreign Application Priority Data

Sep. 16, 2022 (KR) ................ 10-2022-0117162

(51) Int. Cl.
*G05D 1/00* (2024.01)
*G06Q 10/08* (2023.01)

(52) U.S. Cl.
CPC .......... *G05D 1/0297* (2013.01); *G06Q 10/08* (2013.01)

(58) Field of Classification Search
CPC .................... G05D 1/0297; G06Q 10/08
See application file for complete search history.

(56) References Cited

U.S. PATENT DOCUMENTS

| 2009/0265299 A1* | 10/2009 | Hadad ............... G06N 5/02 706/55 |
| 2014/0074339 A1* | 3/2014 | Casado .............. G05D 1/104 701/24 |
| 2018/0100743 A1* | 4/2018 | Diaz ............... G01C 21/3415 |
| 2019/0324456 A1* | 10/2019 | Ryan ............... B64C 13/18 |
| 2021/0405660 A1* | 12/2021 | Liu ............... G05D 1/104 |

* cited by examiner

*Primary Examiner* — Ramsey Refai
(74) *Attorney, Agent, or Firm* — NSIP Law (57) ABSTRACT

A processor implemented method including receiving call information requesting one or more logistics types be supplied to one or more of a plurality of workstations, generating a call occurrence history and a call grouping order according to a respective workstation of the plurality of workstations corresponding to the call information, calculating a target path call count of a target path determined by the call grouping order, the calculating being based on checking the call occurrence history of a shared workstation of the plurality of workstations sharing the target path, calculating a shortest path call count with respect to calls that occur at paths other than the target path, performing a call grouping using the target path call count and the shortest path call count, generating a mission corresponding to a result of the call grouping, and selecting a logistics robot to perform the mission.

20 Claims, 11 Drawing Sheets

| WORKSTATION | PATH |
|---|---|
| 1-A | FIRST PATH |
| 2-A | |
| 1-B | SECOND PATH |
| 2-B | |
| 3-A | |
| 4-A | |
| 3-B | THIRD PATH |
| 4-B | |
| 5-A | |
| 6-A | |
| 5-B | FOURTH PATH |
| 6-B | |
| 7-A | |
| 8-A | |
| 7-B | FIFTH PATH |
| 8-B | |

METHOD AND APPARATUS FOR CONTROLLING LOGISTICS ROBOT

CROSS-REFERENCE TO RELATED APPLICATION

The present application claims the benefit under 35 USC § 119(a) of Patent Application No. 10-2022-0117162, filed on Sep. 16, 2022 in Korea, the entire disclosure of which is incorporated herein by reference for all purposes.

BACKGROUND

1. Field

The present disclosure relates to a method and apparatus for managing a logistics robot fleet.

2. Description of the Related Art

The statements in this section merely provide background information related to the present disclosure and may not constitute prior art.

Logistics automation is built to improve the efficiency of logistics transportation using logistics software and automation machinery, mainly in the production process stage.

Logistics robots that can flexibly adapt to changes in a production line and automate logistics transportation are mainly used to build the logistics automation.

The logistics robots may include automated guided vehicles (AGVs) and autonomous mobile robots (AMRs). Since the automatic guided vehicle can transport logistics via a path guided by a magnetic tape installed on the floor, it cannot flexibly adapt to changes in the production line. On the contrary, the autonomous mobile robot senses the surrounding environment using a vision camera, a laser scanner, a gyro sensor, and an acceleration sensor, and plans an optimal path to drive autonomously. Since these autonomous mobile robots can flexibly adapt to changes in the production line, they are mainly used as substitutes for the automated guided vehicles.

A logistics robot fleet management system is used to manage and control the autonomous mobile robots. The logistics robot fleet management system performs the functions of fleet monitoring, path planning, mission generation, and mission assignment.

In conventional logistics robot fleet management systems, since a single logistics robot is assigned to each production line, there is a problem in that the traffic volume increases in an area where the number of logistics robots increases and the logistics robots intersect.

Moreover, since the conventional logistics robot fleet management systems control the logistics robots assigned to each production line to supply the same type of logistics, there is a disadvantage in that the supply quantity per logistics robot is limited.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a processor-implemented method including receiving, from a manufacturing executing system (IVIES), call information requesting one or more logistics types be supplied to one or more of a plurality of workstations, generating a call occurrence history and a call grouping order according to a respective workstation of the plurality of workstations corresponding to the call information, calculating a target path call count of a target path determined by the call grouping order, the calculating being based on checking the call occurrence history of a shared workstation of the plurality of workstations sharing the target path, calculating a shortest path call count with respect to calls that occur at paths other than the target path, performing a call grouping using the target path call count and the shortest path call count, generating a mission corresponding to a result of the call grouping, and selecting a logistics robot to perform the mission using robot information received from among a plurality of logistics robots and assigning the mission to the selected logistics robot.

The robot information may include one or more of a position of the logistics robot, a state of the logistics robot, a battery level of the logistics robot, and a progress mission of the logistics robot.

The generating the call occurrence history and a call grouping order may include generating a call occurrence history with respect to the respective workstation and assigning a call occurrence count to the call grouping order of the respective workstation, and the call occurrence count is increased by 1 responsive to the call information being received.

The determining the target path may include detecting a call having a smallest value of the call grouping order as a first call, detecting a first workstation of the plurality of workstations that has requested the first call as a target workstation, and detecting a path shared by the target workstation as a target path.

The calculating of the target path call count may include generating a respective call count of each workstation of the target path by checking the call occurrence history of the shared workstation and calculating the target path call count by summing call counts of the each workstation of the target path.

The calculating the shortest path call count may include generating a respective call count of other path workstation of each of other paths that indicate paths other than the target path by checking the call occurrence history of the other path workstations, calculating a call count of the other path by summing the call counts of the other path workstations, and calculating the shortest path call count based on calls requested by a shortest path workstation located on the shortest path from a warehouse to the target workstation among the call counts of the other paths.

The performing the call grouping uses the target path call count and the shortest path call count, and the performing of call grouping further includes performing a first call grouping based on the target path call count and performing a second call grouping based on the target path call count and the shortest path call count.

The performing the first call grouping enters a first call grouping attempt performed when the first call is newly detected, and, if the target path call count is greater than or equal to a first predetermined value representing a supply quantity per logistics robot, the first call grouping attempt enters the first call grouping to group the first call with at least one of the calls of the target path.

If the target path call count is less than the first predetermined value, the first call grouping attempt enters a first call grouping standby in which a first waiting time increases, and, if the first waiting time is less than or equal to a first threshold value and the target path call count is greater than or equal to the first predetermined value, the first call grouping standby enters the first call grouping.

In the performing the second call grouping, if the first waiting time is greater than the first threshold value, the first call grouping attempt enters a second call grouping attempt, and, if a sum of the target path call count and the shortest path call count is greater than or equal to the first predetermined value, the second call grouping attempt enters the second call grouping to group the first call with at least one of the call of the target path and the call of the other path.

If the sum of the target path call count and the shortest path call count is less than the first predetermined value, the second call grouping attempt enters a second call grouping standby in which a second waiting time increases, and, if the second waiting time is less than or equal to a second threshold value and the sum of the target path call count and the shortest path call count is greater than or equal to the first predetermined value, the second call grouping standby enters the second call grouping attempt.

If the second waiting time is greater than the second threshold, the second call grouping standby enters a single supply.

In a general aspect, here is provided an electronic apparatus including a communication unit that receives robot information from a plurality of logistics robots and receives, from a manufacturing executing system (MES), call information requesting one or more logistics types be supplied to one or more of a plurality of workstations, a call processing unit that generates a call occurrence history and a call grouping order according to a respective workstation of the plurality of workstations corresponding to the call information and detects a target path based on the call grouping order, a call counting unit that calculates a target path call count by checking the call occurrence history of a shared workstation sharing the target path and calculates a call count of a shortest path with respect to calls that occur at paths other than the target path, a call grouping unit that performs a call grouping using the target path call count and the shortest path call count, a mission generation unit that generates a mission corresponding to a result of the call grouping, and a mission assignment unit that selects a logistics robot to perform the mission using the robot information and assigns the mission to the selected logistics robot.

In a general aspect, here is provided a processor-implemented method including generating a call occurrence history and a call grouping order corresponding to call information requesting one or more logistics types be supplied to one or more of a plurality of workstations, calculating a target path call count of a target path, the target path being determined by the call grouping order based the call occurrence history of a shared workstation of the plurality of workstations sharing the target path, calculating a shortest path call count with respect to calls that occur at paths other than the target path, generating a mission corresponding to a call grouping based on the target path call count and the shortest path call count, and selecting a logistics robot from among a plurality of logistics robots to perform the mission.

The selecting of the logistics robot is based on robot information which includes one or more of a position of the logistics robot, a state of the logistics robot, a battery level of the logistics robot, and a progress mission of the logistics robot.

The determining of the target path may include detecting a call having a smallest value of the call grouping order as a first call and detecting a path shared by a first workstation of the plurality of workstations that has requested the first call as a target path.

The calculating the shortest path call count may include generating a respective call count of other path workstation of each of other paths that indicate paths other than the target path by checking the call occurrence history of the other path workstations, calculating a call count of the other path by summing the call counts of the other path workstations, and calculating the shortest path call count based on calls requested by a shortest path workstation located on the shortest path from a warehouse to the shared workstation among the call counts of the other paths.

The generating the call grouping may include performing a first call grouping based on the target path call count and performing a second call grouping based on the target path call count and the shortest path call count.

The performing the first call grouping enters a first call grouping attempt performed when the first call is newly detected, and, if the target path call count is greater than or equal to a first predetermined value representing a supply quantity per logistics robot, the first call grouping attempt enters the first call grouping to group the first call with at least one of the calls of the target path.

In the performing the second call grouping, if the first waiting time is greater than the first threshold value, the first call grouping attempt enters a second call grouping attempt, and, if a sum of the target path call count and the shortest path call count is greater than or equal to the first predetermined value, the second call grouping attempt enters the second call grouping to group the first call with at least one of the call of the target path and the call of the other path.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Figure 1:
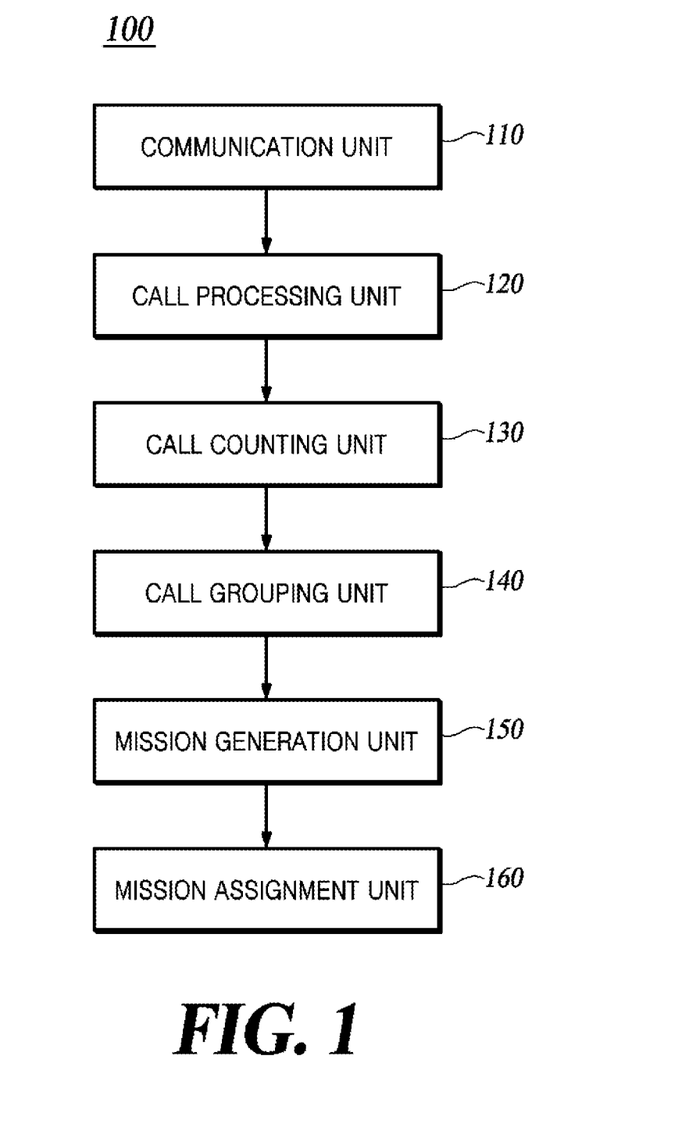
FIG. 1 is a schematic block diagram of a logistics robot fleet management apparatus according to an embodiment of the present disclosure.

FIG. 1 is a schematic block diagram of a logistics robot fleet management apparatus according to an embodiment of the present disclosure.

Referring to FIG. 1, the logistics robot fleet management apparatus 100 according to an embodiment of the present disclosure may include all or part of a communication unit 110, a call processing unit 120, a call counting unit 130, a call grouping unit 140, a mission generation unit 150, and a mission assignment unit 160.

The communication unit 110 receives robot information from a plurality of logistics robots. Here, the robot information may include the position, state, battery level, and progress mission of each logistics robot. The communication unit 110 receives, from a manufacturing executing system (IVIES), call information for requesting that any one of various types of logistics be supplied to any one of a plurality of workstations.

The call processing unit 120 generates a call occurrence history and a call grouping order with respect to the workstation corresponding to the call information and detects a target path based on the call grouping order.

The call counting unit 130 calculates a call count of the target path by checking the call occurrence history of the workstation sharing the target path and calculates a call count of a shortest path with respect to calls that occur at paths other than the target path.

The call grouping unit 140 performs a call grouping using the call count of the target path and the call count of the shortest path.

The mission generation unit 150 generates a mission corresponding to the result of the call grouping.

The mission assignment unit 160 selects a logistics robot that will perform the mission using the robot information and assigns the mission to the selected logistics robot.

Figure 2A:
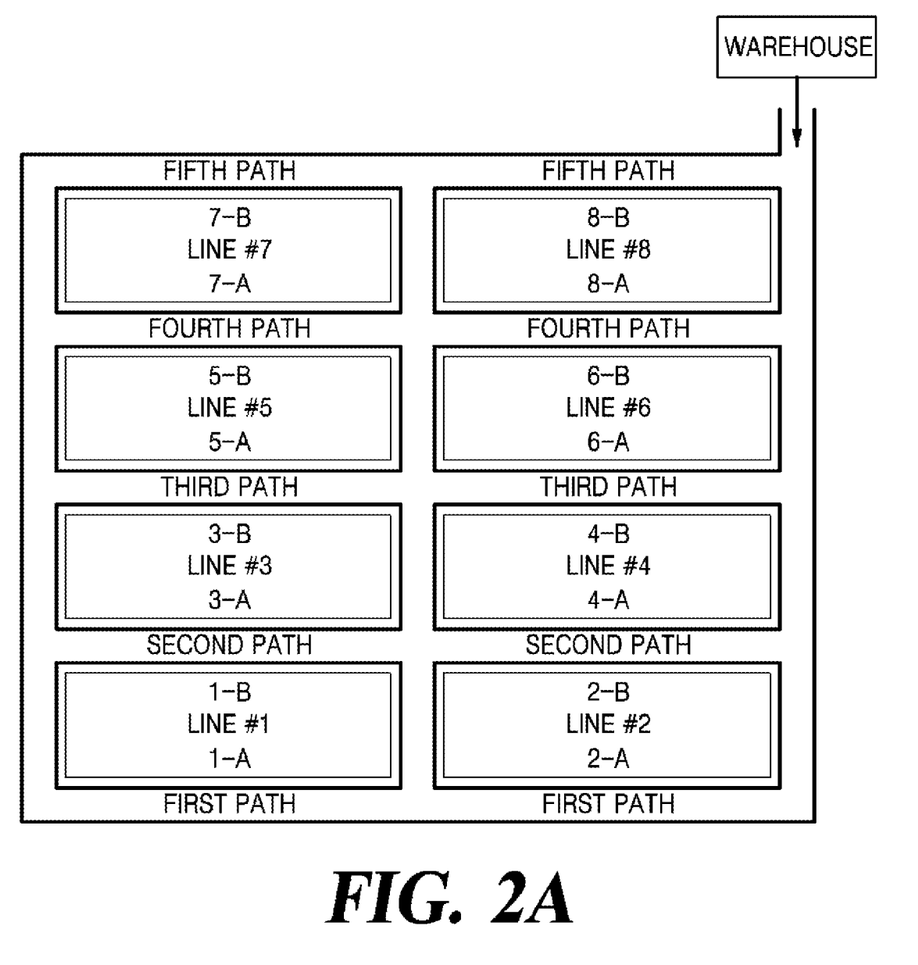
FIGS. 2A and 2B are diagrams illustrating examples of workstations arranged in a production line and paths shared by the workstations according to an embodiment of the present disclosure.
Figure 2B:
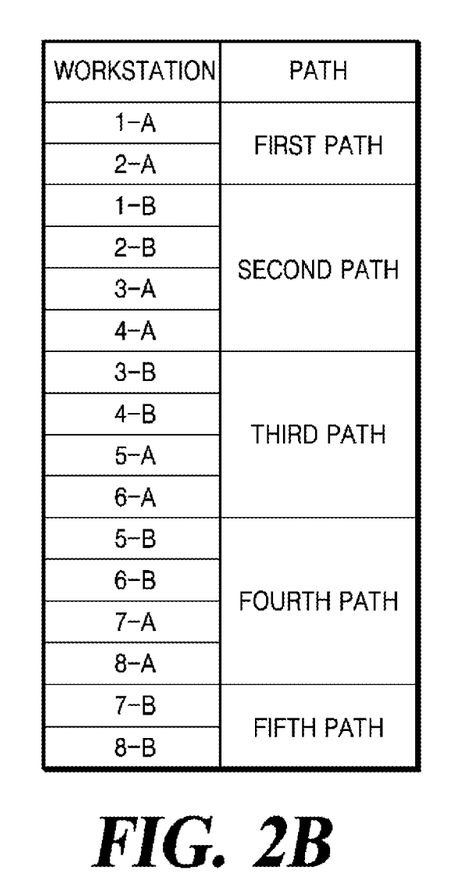

FIGS. 2A and 2B are diagrams illustrating examples of workstations arranged in a production line and paths shared by the workstations according to an embodiment of the present disclosure.

Referring to FIG. 2A, a production line may be composed of a plurality of lines, and a plurality of workstations may be arranged in each line. For example, workstations 1-A and 1-B may be arranged in a first production line.

The production lines form a plurality of paths used by a plurality of logistics robots to supply various types of logistics from a warehouse to a plurality of workstations. For example, the production lines may form a first path, a second path, a third path, a fourth path, and a fifth path.

Referring to FIG. 2B, each path is shared by a plurality of workstations. For example, the second path may be shared by workstations 1-B, 2-B, 3-A and 4-A.

Figure 3:
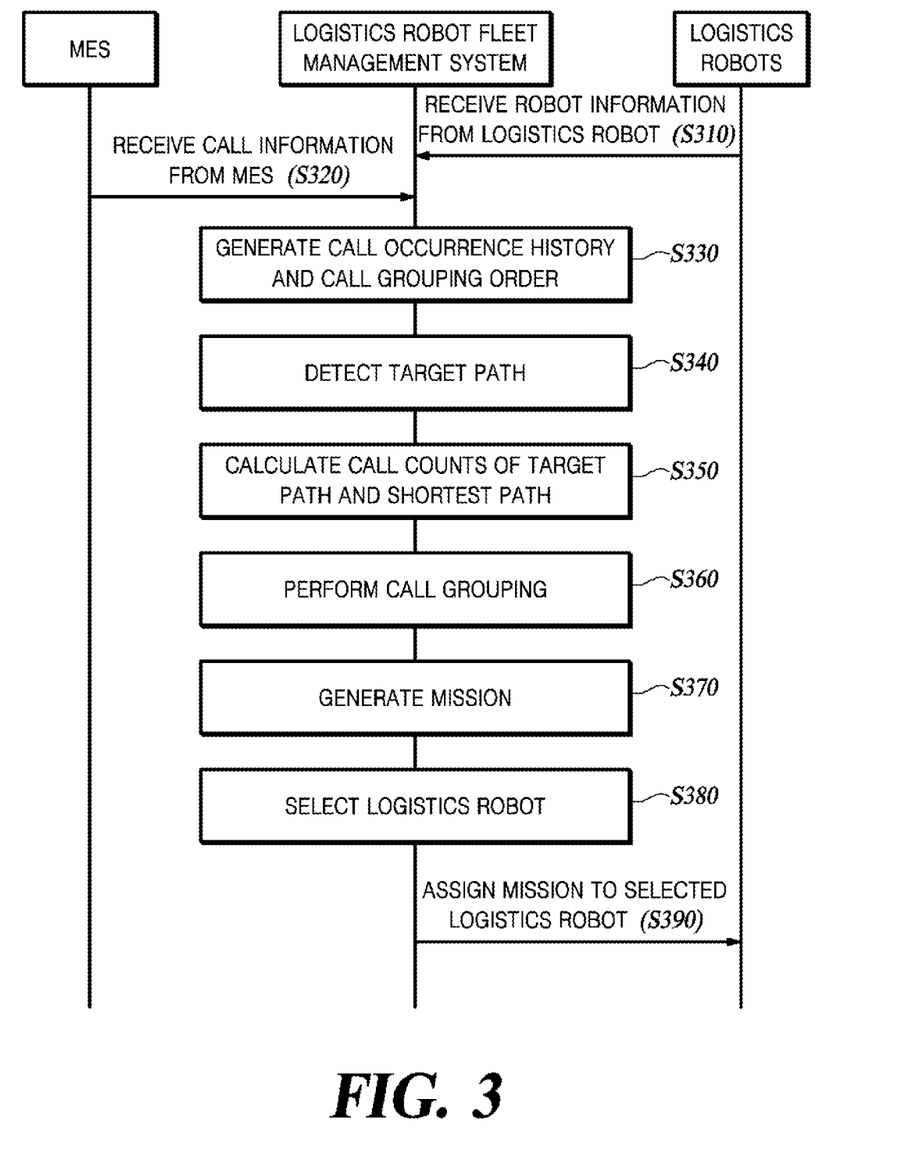
FIG. 3 is a flowchart illustrating a process in which a logistics robot fleet management apparatus according to an embodiment of the present disclosure supplies various types of logistics using call grouping.

FIG. 3 is a flowchart illustrating a process in which the logistics robot fleet management apparatus according to an embodiment of the present disclosure supplies various types of logistics using call grouping.

Referring to FIGS. 1 to 3, the communication unit 110 receives robot information from a plurality of logistics robots (S310).

The communication unit 110 receives, from a manufacturing executing system (MES), call information for requesting that any one of various types of logistics be supplied to any one of a plurality of workstations (S320).

The call processing unit 120 generates a call occurrence history and a call grouping order with respect to the workstation corresponding to the call information (S330).

The call processing unit 120 detects a target path based on the call grouping order (S340).

The call counting unit 130 calculates a call count of the target path by checking the call occurrence history of the workstation sharing the target path and calculates a call count of a shortest path with respect to calls that occur at paths other than the target path (S350).

The call grouping unit 140 performs a call grouping using the call count of the target path and the call count of the shortest path (S360).

The mission generation unit 150 generates a mission corresponding to the result of the call grouping (S370).

The mission assignment unit 160 selects a logistics robot that will perform the mission from a plurality of robots using the robot information (S380).

The mission assignment unit 160 selects a logistics robot that will perform the mission using the robot information (S380).

The mission assignment unit 160 assigns the mission to the selected logistics robot (S390).

Figure 4:
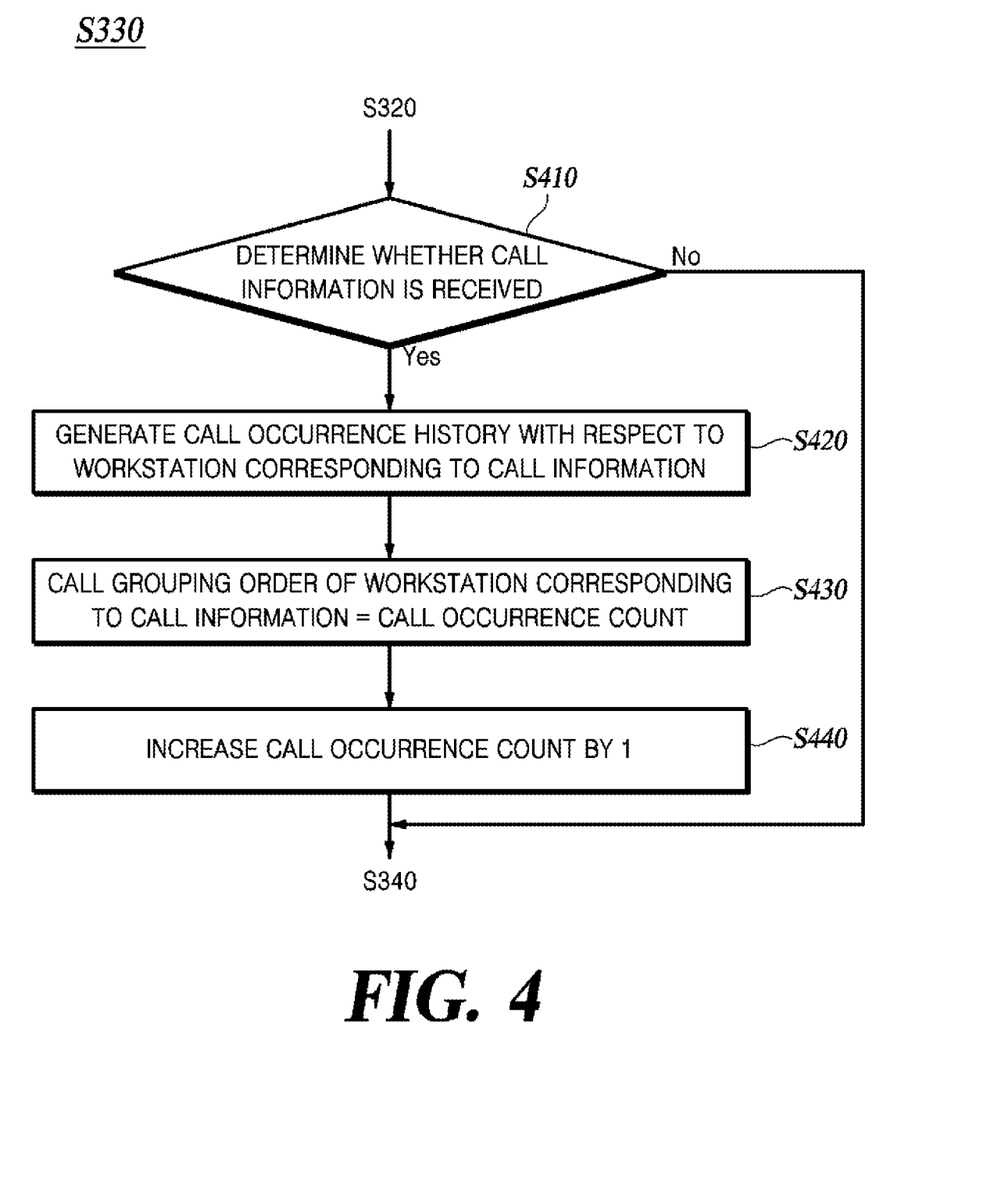
FIG. 4 is a flowchart illustrating the process of S330 of FIG. 3 in detail.

FIG. 4 is a flowchart illustrating the process of S330 of FIG. 3 in detail.

Referring to FIGS. 1 to 4, the call processing unit 120 determines whether call information is received (S410).

If it is determined in the process of S410 that the call information is received, the call processing unit 120 generates a call occurrence history with respect to the workstation corresponding to the call information (S420).

The call processing unit 120 assigns a call occurrence count to the call grouping order of the workstation corresponding to the call information (S430).

The call processing unit 120 increases the call occurrence count by 1 whenever the call information is received (S440).

Figure 5:
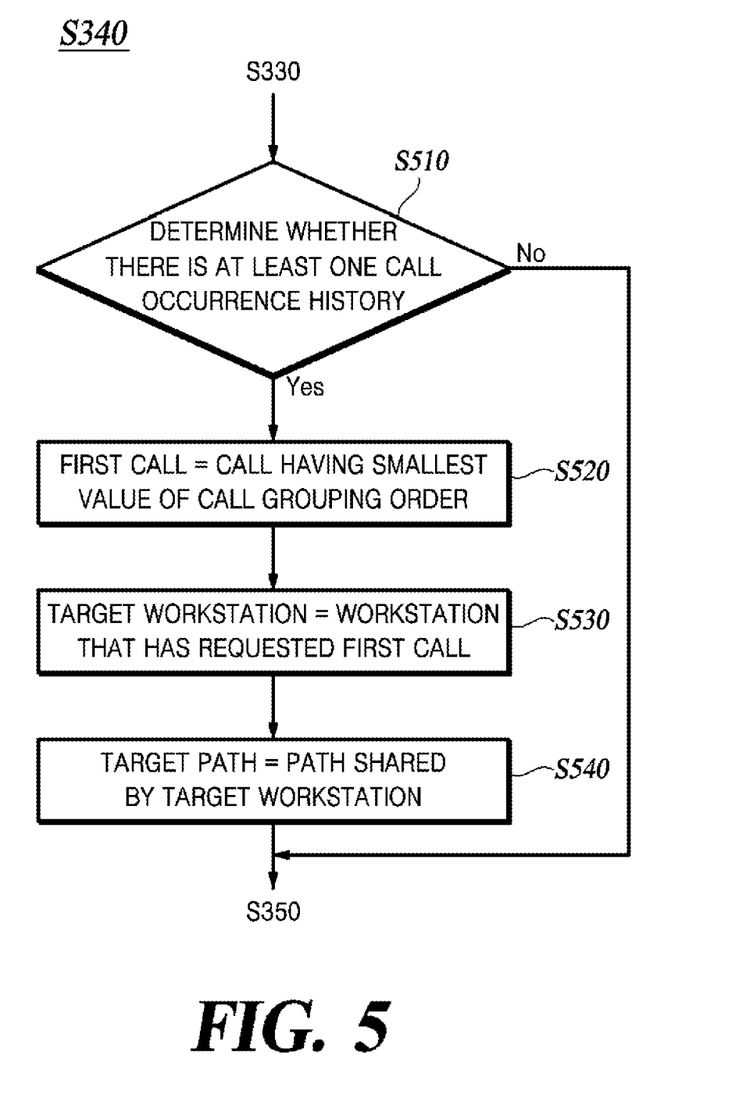
FIG. 5 is a flowchart illustrating the process of S340 of FIG. 3 in detail.

FIG. 5 is a flowchart illustrating the process of S340 of FIG. 3 in detail.

Referring to FIGS. 1 to 5, the call processing unit 120 determines whether there is at least one call occurrence history (S510).

If it is determined in the process of S510 that there is at least one call occurrence history, the call processing unit 120 detects a call having the smallest value of the call grouping order as a first call (S520).

If it is determined in the process of S510 that there is at least one call occurrence history, the call processing unit 120 detects a workstation that has requested the first call as a target workstation (S530).

If it is determined in the process of S510 that there is at least one call occurrence history, the call processing unit 120 detects a path shared by the target workstation as a target path (S540).

Figure 6:
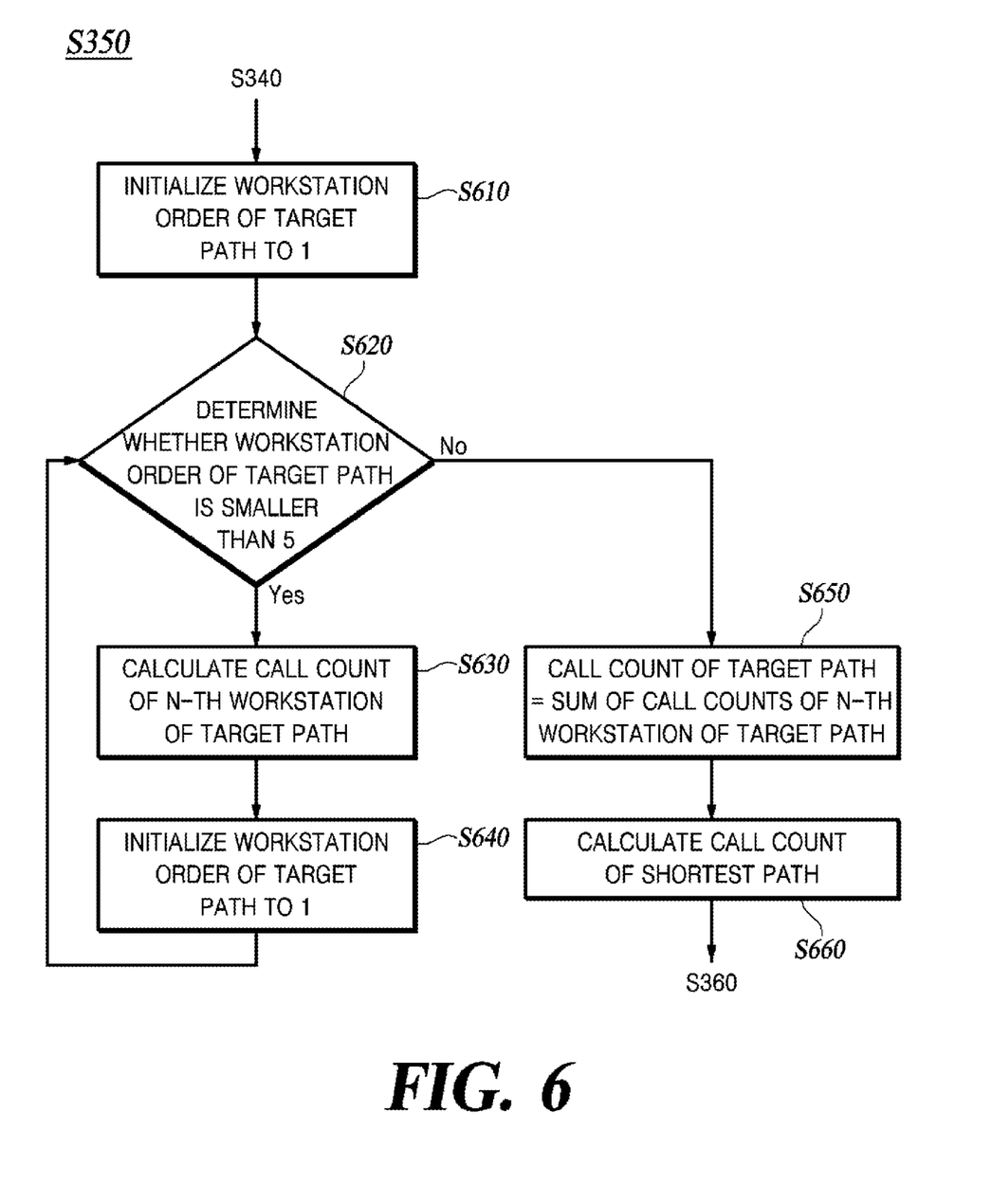
FIG. 6 is a flowchart illustrating the process of S350 of FIG. 3 in detail.

FIG. 6 is a flowchart illustrating the process of S350 of FIG. 3 in detail.

Referring to FIGS. 1 to 6, for example, if the target path is the second path, the workstations 1-B, 2-B, 3-A and 4-A sharing the second path may be defined as a first workstation, a second workstation, a third workstation, and a fourth workstation, respectively.

Since the call counting unit 130 repeats the process of S630 from the first workstation of the target path, it initializes the workstation order of the target path to 1 (S610).

Since the call counting unit 130 repeats the process of S630 up to the fourth workstation of the target path, it determines whether the workstation order of the target path is smaller than 5 (S620).

If it is determined in the process of step S620 that the workstation order of the target path is smaller than 5, the call counting unit 130 calculates a call count of the n-th workstation (where n is a natural number) of the target path (S630). Here, the call count of the n-th workstation of the target path is generated by checking the call occurrence history for the n-th workstation.

Since the call counting unit 130 repeats the process of S630 from the first workstation to the fourth workstation of the target path in this order, it increases the workstation order of the target path by 1 (S640).

If it is determined in the process of S620 that the workstation order of the target path is greater than or equal to 5, the call counting unit 130 calculates a call count of the target path by summing the call counts of the respective workstations of the target path (S650).

The call counting unit 130 calculates a call count of the shortest path with respect to calls that occur at paths other than the target path (S660).

Figure 7:
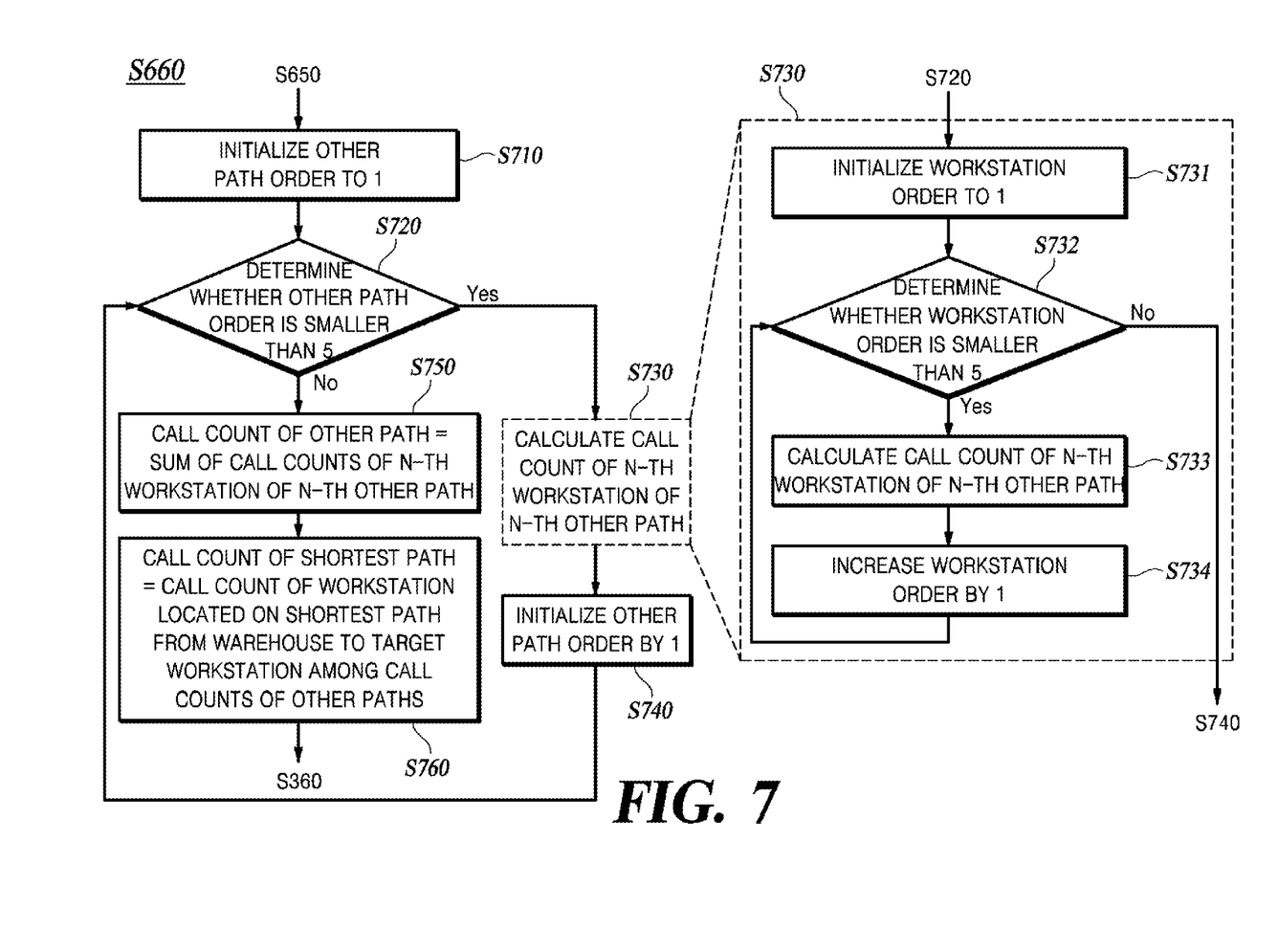
FIG. 7 is a flowchart illustrating the process of S660 of FIG. 6 in detail.

FIG. 7 is a flowchart illustrating the process of S660 of FIG. 6 in detail.

Referring to FIGS. 1 to 7, for example, if the target path is the third path, other paths that indicate paths other than the target path are the first path, the second path, the fourth path, and the fifth path. Here, the first path, the second path, the fourth path, and the fifth path may be defined as a first other path, a second other path, a third other path, and a fourth other path, respectively.

Since the call counting unit 130 repeats the process of S730 from the first other path, it initializes the other path order to 1 (S710).

Since the call counting unit 130 repeats the process of S730 up to the fourth other path, it determines whether the other path order is smaller than 5 (S720).

If it is determined in the process of S720 that the other path order is smaller than 5, the call counting unit 130 calculates a call count of the n-th workstation of the n-th other path (S730).

Since the call counting unit 130 repeats the process of S733 from the first workstation of the n-th other path, it initializes the workstation order to 1 (S731).

Since the call counting unit 130 repeats the process S733 up to the fourth workstation of the n-th other path, it determines whether the workstation order is smaller than 5 (S732).

If it is determined in the process of S732 that the workstation order is smaller than 5, the call counting unit 130 calculates the call count of the n-th workstation of the n-th other path (S733). Here, the call count of the n-th workstation of the n-th other path is generated by checking the call occurrence history for the n-th workstation.

Since the call counting unit 130 repeats the process S733 from the first workstation of the n-th other path to the fourth workstation of the n-th other path in this order, it increases the workstation order by 1 (S734).

If it is determined in the process of S732 that the workstation order is greater than or equal to 5, the call counting unit 130 increases the other path order by 1 (S740).

If it is determined in the process of S720 that the other path order is greater than or equal to 5, the call counting unit 130 calculates a call count of the other path by summing the call counts of the n-th workstation of the n-th other path (S750).

The call counting unit 130 calculates the call count of the shortest path based on calls requested by the workstation located on the shortest path from the warehouse to the target workstation among the call counts of the other paths (S760). For example, the call counting unit 130 may calculate the call count of the shortest path by finding the shortest path from the warehouse to the target workstation using Dijkstra algorithm and detecting a workstation located on the shortest path among the workstations corresponding to the call counts of the other paths.

Figure 8:
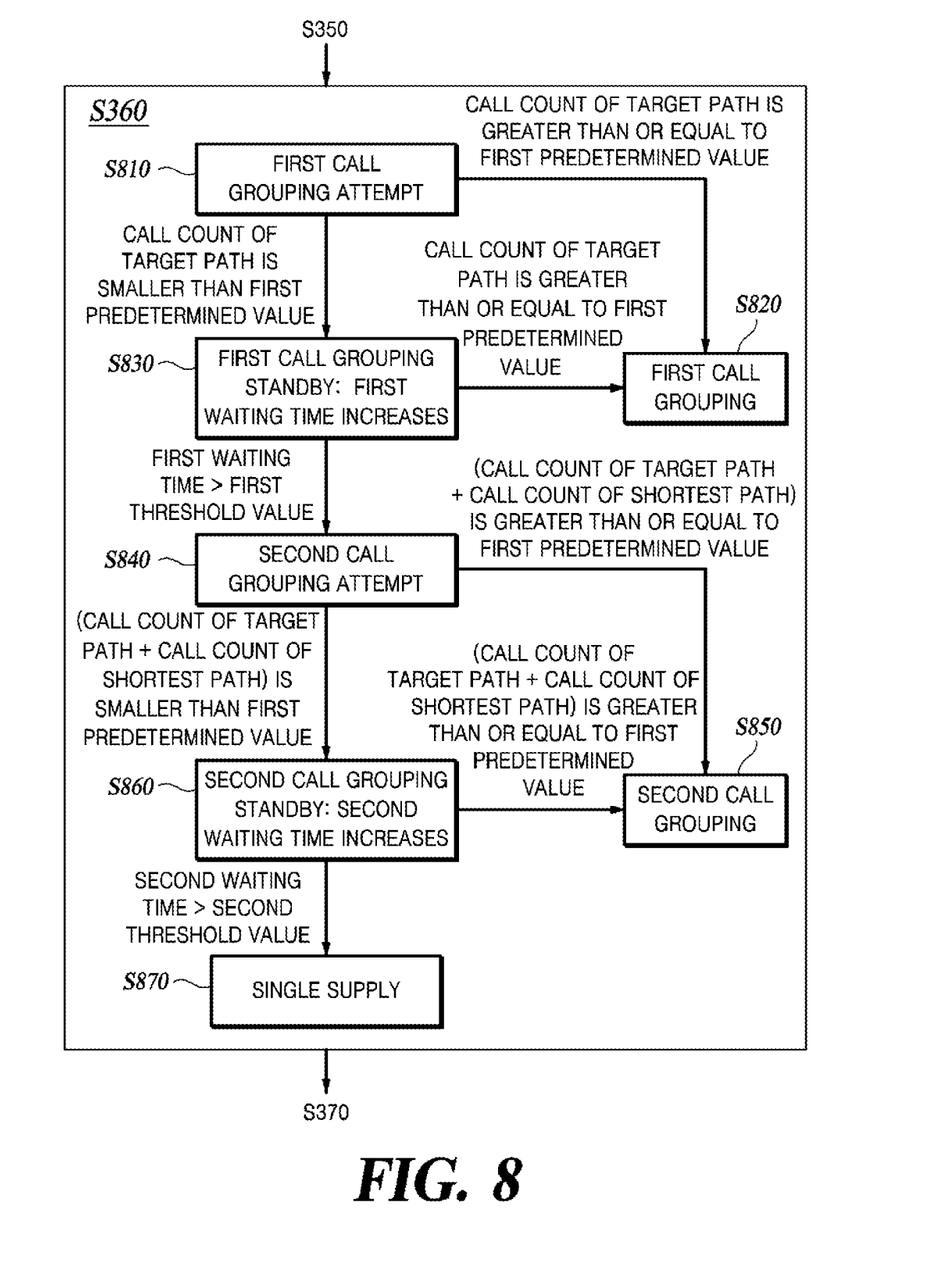
FIG. 8 is a flowchart illustrating the process of S360 of FIG. 3 in detail.

FIG. 8 is a flowchart illustrating the process of S360 of FIG. 3 in detail.

Referring to FIGS. 1 to 8, the call grouping unit 140 performs a first call grouping attempt only when the first call is newly detected and determines whether the call count of the target path is greater than or equal to a first predetermined value representing the supply quantity per logistics robot (S810).

If it is determined in the process of S810 that the call count of the target path is greater than or equal to the first predetermined value, or if it is determined in the process of S830 that a first waiting time is smaller than or equal to a first threshold value and the call count of the target path is greater than or equal to the first predetermined value, the call grouping unit 140 performs a first call grouping to group the first call with at least one of the calls of the target path (S820). For example, if the first predetermined value is 4 and the call count of the target path is 4, the call grouping unit 140 groups the first call with three calls of the target path.

If it is determined in the process of S810 that the call count of the target path is smaller than the first predetermined value, the call grouping unit 140 performs a first call grouping standby in which the first waiting time increases (S830).

If the first waiting time is greater than the first threshold value in the process of S830, the call grouping unit 140 performs a second call grouping attempt to determine whether the sum of the call count of the target path and the call count of the shortest path is greater than or equal to the first predetermined value (S840).

If it is determined in the process of S840 that the sum of the call count of the target path and the call count of the shortest path is greater than or equal to the first predetermined value, or if it is determined in the process of S860 that a second waiting time is smaller than or equal to a second threshold value and the sum of the call count of the target path and the call count of the shortest path is greater than or equal to the first predetermined value, the call grouping unit 140 performs a second call grouping to group the first call with at least one of the call of the target path and the call of the other path (S850). For example, if the first predetermined value is 4, the call count of the target path is 2, and the call count of the shortest path is 2, the call grouping unit 140 groups the first call with one call of the target path and two calls of the other path.

If it is determined in the process of S840 that the sum of the call count of the target path and the call count of the shortest path is smaller than the first predetermined value, the call grouping unit 140 performs a second call grouping standby in which the second waiting time increases. (S860).

If the second waiting time is greater than the second threshold in the process of S860, the call grouping unit 140 performs a single supply for the first call (S870).

Figure 9:
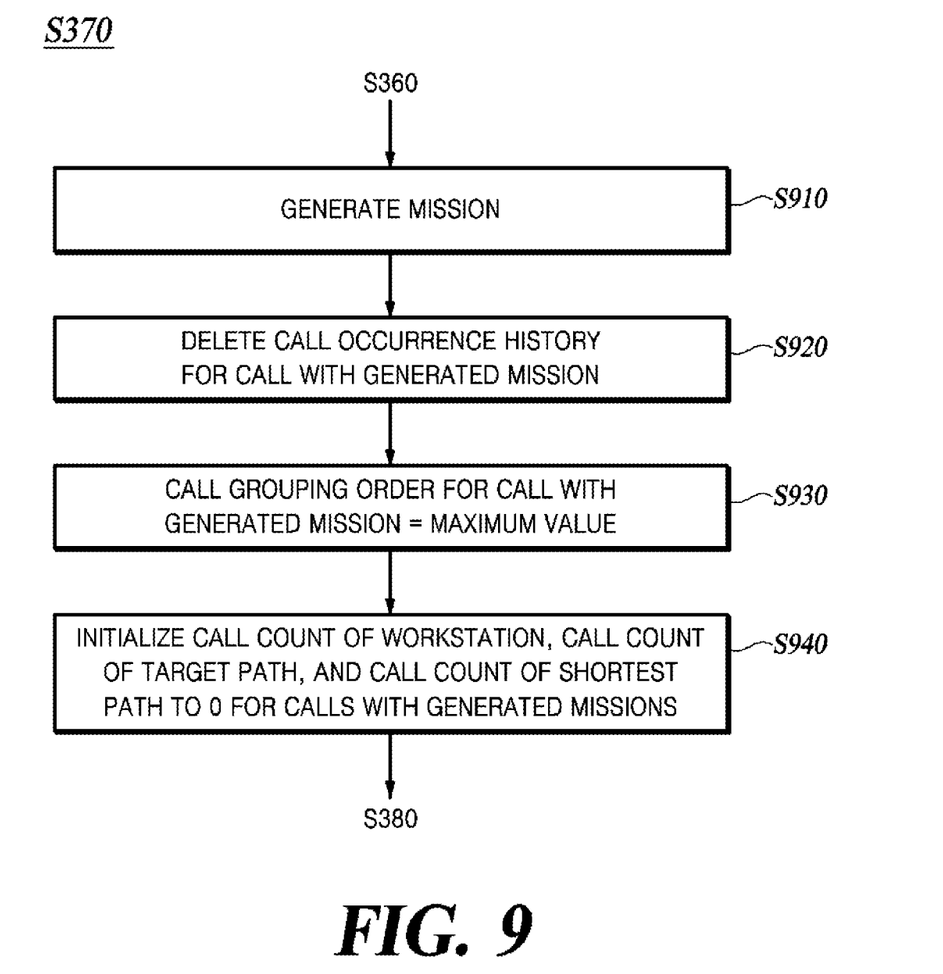
FIG. 9 is a flowchart illustrating the process of S370 of FIG. 3 in detail.

FIG. 9 is a flowchart illustrating the process of S370 of FIG. 3 in detail.

Referring to FIGS. 1 to 9, the mission generation unit 150 generates a mission corresponding to the result of the call grouping in the process of S360 (S910).

The mission generation unit 150 deletes the call occurrence history for the call having the generated mission (S920).

The mission generation unit 150 sets the value of the call grouping order for the call having the generated mission to a maximum value (S930). For example, if the maximum value is 65535, the call processing unit 120 may detect the first call, the target workstation, and the target path based on the call having the smallest value of the call grouping order, except for calls having the generated missions in the next cycle.

The mission generation unit 150 initializes the call count of the workstation, the call count of the target path, and the call count of the shortest path to 0 for the calls having the generated missions (S940).

Figure 10:
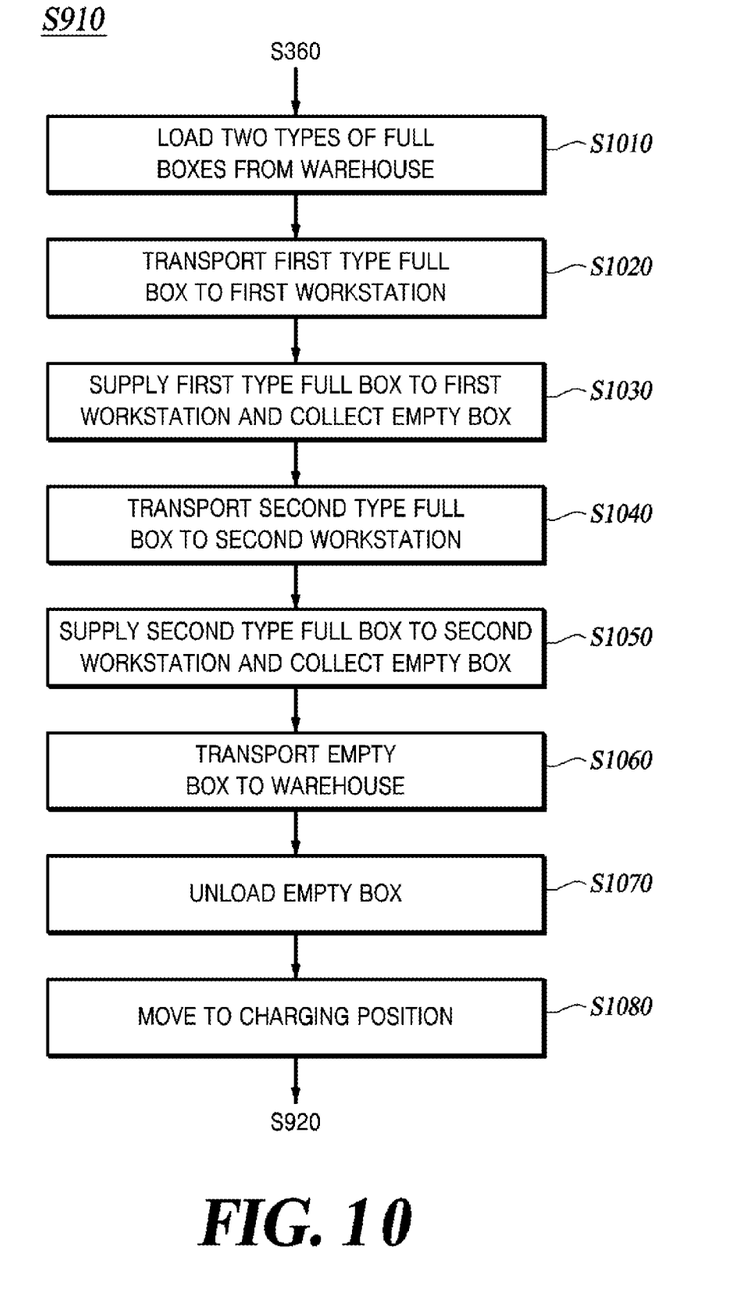
FIG. 10 is a flowchart illustrating the process of S910 of FIG. 9 in detail.

FIG. 10 is a flowchart illustrating the process of S910 of FIG. 9 in detail.

Referring to FIGS. 1 to 10, for example, if the first predetermined value is set to 2, the target path is detected as the second path, and workstations 1-B and 2-B sharing the second path have undergone the first call grouping, the mission generation unit 150 generates a task for the logistics robot to load two types of full boxes from the warehouse (S1010).

The mission generation unit 150 generates a task for the logistics robot to transport the first type full box to the first workstation 1-B (S1020).

The mission generation unit 150 generates a task for the logistics robot to supply the first type full box to the first workstation 1-B and collect an empty box (S1030).

The mission generation unit 150 generates a task for the logistics robot to transport the second type full box to the second workstation 2-B (S1040).

The mission generation unit 150 generates a task for the logistics robot to supply the second type full box to the second workstation 2-B and collect an empty box (S1050).

The mission generation unit 150 generates a task for the logistics robot to transport the empty box to the warehouse (S1060).

The mission generation unit 150 generates a task for the logistics robot to unload the empty box in the warehouse (S1070).

The mission generation unit 150 generates a task for the logistics robot to move to a charging position (S1080).

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   receiving, from a manufacturing executing system (MES), call information requesting one or more logistics types be supplied to one or more of a plurality of workstations;
   generating a call occurrence history and a call grouping order according to a respective workstation of the plurality of workstations corresponding to the call information;
   calculating a target path call count of a target path determined by the call grouping order, wherein the calculating is based on checking the call occurrence history of a shared workstation of the plurality of workstations sharing the target path;
   calculating a shortest path call count with respect to calls that occur at paths other than the target path;
   performing a call grouping using the target path call count and the shortest path call count;
   generating a mission corresponding to a result of the call grouping; and
   selecting a logistics robot to perform the mission using robot information received from among a plurality of logistics robots and assigning the mission to the selected logistics robot.

2. The method of claim 1, wherein the robot information includes one or more of a position of the logistics robot, a state of the logistics robot, a battery level of the logistics robot, and a progress mission of the logistics robot.

3. The method of claim 1, wherein the generating the call occurrence history and a call grouping order comprises:
   generating a call occurrence history with respect to the respective workstation; and
   assigning a call occurrence count to the call grouping order of the respective workstation, and
   wherein the call occurrence count is increased by 1 responsive to the call information being received.

4. The method of claim 1, wherein the determining the target path comprises:
   detecting a call having a smallest value of the call grouping order as a first call;
   detecting a first workstation of the plurality of workstations that has requested the first call as a target workstation; and
   detecting a path shared by the target workstation as a target path.

5. The method of claim 1, wherein the calculating of the target path call count comprises:
   generating a respective call count of each workstation of the target path by checking the call occurrence history of the shared workstation; and
   calculating the target path call count by summing call counts of the each workstation of the target path.

6. The method of claim 4, wherein the calculating the shortest path call count comprises:
   generating a respective call count of other path workstation of each of other paths that indicate paths other than the target path by checking the call occurrence history of the other path workstations;
   calculating a call count of the other path by summing the call counts of the other path workstations; and
   calculating the shortest path call count based on calls requested by a shortest path workstation located on the shortest path from a warehouse to the target workstation among the call counts of the other paths.

7. The method of claim 6, wherein the performing the call grouping uses the target path call count and the shortest path call count, and
   wherein the performing of call grouping further comprises:
   performing a first call grouping based on the target path call count; and
   performing a second call grouping based on the target path call count and the shortest path call count.

8. The method of claim 7, wherein the performing the first call grouping enters a first call grouping attempt performed when the first call is newly detected, and
   wherein, if the target path call count is greater than or equal to a first predetermined value representing a supply quantity per logistics robot, the first call grouping attempt enters the first call grouping to group the first call with at least one of the calls of the target path.

9. The method of claim 8, wherein, if the target path call count is less than the first predetermined value, the first call grouping attempt enters a first call grouping standby in which a first waiting time increases, and
   wherein, if the first waiting time is less than or equal to a first threshold value and the target path call count is greater than or equal to the first predetermined value, the first call grouping standby enters the first call grouping.

10. The method of claim 9, wherein, in the performing the second call grouping, if the first waiting time is greater than the first threshold value, the first call grouping attempt enters a second call grouping attempt, and
    wherein, if a sum of the target path call count and the shortest path call count is greater than or equal to the first predetermined value, the second call grouping attempt enters the second call grouping to group the first call with at least one of the call of the target path and the call of the other path.

11. The method of claim 10, wherein, if the sum of the target path call count and the shortest path call count is less than the first predetermined value, the second call grouping attempt enters a second call grouping standby in which a second waiting time increases, and wherein, if the second waiting time is less than or equal to a second threshold value and the sum of the target path call count and the shortest path call count is greater than or equal to the first predetermined value, the second call grouping standby enters the second call grouping attempt.

12. The method of claim 11, wherein, if the second waiting time is greater than the second threshold, the second call grouping standby enters a single supply.

13. An electronic apparatus, the apparatus comprising:
a communication unit that receives robot information from a plurality of logistics robots and receives, from a manufacturing executing system (MES), call information requesting one or more logistics types be supplied to one or more of a plurality of workstations;
a call processing unit that generates a call occurrence history and a call grouping order according to a respective workstation of the plurality of workstations corresponding to the call information and detects a target path based on the call grouping order;
a call counting unit that calculates a target path call count by checking the call occurrence history of a shared workstation sharing the target path and calculates a call count of a shortest path with respect to calls that occur at paths other than the target path;
a call grouping unit that performs a call grouping using the target path call count and the shortest path call count;
a mission generation unit that generates a mission corresponding to a result of the call grouping; and
a mission assignment unit that selects a logistics robot to perform the mission using the robot information and assigns the mission to the selected logistics robot.

14. A processor-implemented method, the method comprising:
generating a call occurrence history and a call grouping order corresponding to call information requesting one or more logistics types be supplied to one or more of a plurality of workstations;
calculating a target path call count of a target path, wherein the target path is determined by the call grouping order based the call occurrence history of a shared workstation of the plurality of workstations sharing the target path;
calculating a shortest path call count with respect to calls that occur at paths other than the target path;
generating a mission corresponding to a call grouping based on the target path call count and the shortest path call count; and
selecting a logistics robot from among a plurality of logistics robots to perform the mission.

15. The method of claim 14, wherein the selecting of the logistics robot is based on robot information, the robot information including one or more of a position of the logistics robot, a state of the logistics robot, a battery level of the logistics robot, and a progress mission of the logistics robot.

16. The method of claim 14, wherein the determining of the target path comprises:
detecting a call having a smallest value of the call grouping order as a first call; and
detecting a path shared by a first workstation of the plurality of workstations that has requested the first call as a target path.

17. The method of claim 14, wherein the calculating the shortest path call count comprises:
generating a respective call count of other path workstation of each of other paths that indicate paths other than the target path by checking the call occurrence history of the other path workstations;
calculating a call count of the other path by summing the call counts of the other path workstations; and
calculating the shortest path call count based on calls requested by a shortest path workstation located on the shortest path from a warehouse to the shared workstation among the call counts of the other paths.

18. The method of claim 14, wherein the generating the call grouping comprises:
performing a first call grouping based on the target path call count; and
performing a second call grouping based on the target path call count and the shortest path call count.

19. The method of claim 18, wherein the performing the first call grouping enters a first call grouping attempt performed when the first call is newly detected, and
wherein, if the target path call count is greater than or equal to a first predetermined value representing a supply quantity per logistics robot, the first call grouping attempt enters the first call grouping to group the first call with at least one of the calls of the target path.

20. The method of claim 19, wherein, in the performing the second call grouping, if the first waiting time is greater than the first threshold value, the first call grouping attempt enters a second call grouping attempt, and
wherein, if a sum of the target path call count and the shortest path call count is greater than or equal to the first predetermined value, the second call grouping attempt enters the second call grouping to group the first call with at least one of the call of the target path and the call of the other path.

* * * * *